US009122653B2

United States Patent
Fleming et al.

(10) Patent No.: US 9,122,653 B2
(45) Date of Patent: *Sep. 1, 2015

(54) MIGRATING VIRTUAL MACHINES ACROSS SITES

(71) Applicant: International Business Machines Corporation, Armonk, NY (US)

(72) Inventors: Mark S. Fleming, Tucson, AZ (US); Jiang Peng, Shanghai (CN); Zhang Xin, Shanghai (CN); Rong Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,963

(22) Filed: Nov. 12, 2014

(65) Prior Publication Data

US 2015/0074453 A1 Mar. 12, 2015

Related U.S. Application Data

(63) Continuation of application No. 13/787,650, filed on Mar. 6, 2013, now Pat. No. 8,904,139, which is a continuation of application No. 13/457,245, filed on Apr. 26, 2012, now Pat. No. 8,909,884.

(30) Foreign Application Priority Data

Apr. 26, 2011 (CN) .......................... 2011 1 0104772

(51) Int. Cl.
*G06F 12/00* (2006.01)
*G06F 11/20* (2006.01)
(Continued)

(52) U.S. Cl.
CPC .............. *G06F 11/203* (2013.01); *G06F 9/455* (2013.01); *G06F 9/45558* (2013.01); *G06F 11/1469* (2013.01); *G06F 11/2058* (2013.01); *H04L 29/08* (2013.01); *G06F 2009/4557* (2013.01)

(58) Field of Classification Search
CPC .......... G06F 11/469; G06F 2009/4557; G06F 9/45558; G06F 9/455; H04L 29/08
USPC ..................... 711/162, 165; 714/6.2, 6.23, 6.3
See application file for complete search history.

(56) References Cited

U.S. PATENT DOCUMENTS 7,257,811 B2    8/2007   Hunt et al.
7,603,670 B1   10/2009   van Rietschote
(Continued)

FOREIGN PATENT DOCUMENTS

CN         101206553          6/2008

OTHER PUBLICATIONS

VMware Corporation, "VMware VMotion; Live Migration for Virtual Machines Without Service Interruption," Product datasheet, 2009.

(Continued)

*Primary Examiner* — John Lane
(74) *Attorney, Agent, or Firm* — Zilka-Kotab, PC.

(57) ABSTRACT

A method for managing data swapping in a migration of virtual memory data in a virtual machine, where the data swapping is from a first host associated with a first storage device to a second host associated with a second storage device, is provided in another embodiment. The method includes receiving a migration instruction indicating the virtual machine to be migrated, and instructing the first host to copy data of the virtual machine to a sub-logical unit in the first storage device, the sub-logical unit having a mirror logical unit in the second storage device. A notification is sent, the notification being usable to instruct the second host to read data from the mirror logical unit.

20 Claims, 6 Drawing Sheets

(51) Int. Cl.
G06F 11/14 (2006.01)
G06F 9/455 (2006.01)
H04L 29/08 (2006.01)

(56) References Cited

U.S. PATENT DOCUMENTS

| | | |
|---|---|---|
| 8,539,177 B1 | 9/2013 | Madnani et al. |
| 8,904,139 B2 | 12/2014 | Fleming et al. |
| 8,909,884 B2 | 12/2014 | Fleming et al. |
| 2004/0034808 A1 | 2/2004 | Day, III et al. |
| 2004/0039959 A1 | 2/2004 | LeCrone et al. |
| 2007/0061531 A1 | 3/2007 | Bartfai et al. |
| 2007/0180436 A1 | 8/2007 | Travostino et al. |
| 2008/0235482 A1 | 9/2008 | Armstrong et al. |
| 2008/0301492 A1 | 12/2008 | Honda et al. |
| 2009/0150463 A1 | 6/2009 | Sekiguchi et al. |
| 2009/0307447 A1 | 12/2009 | Jacobs et al. |
| 2010/0122051 A1 | 5/2010 | Maki et al. |
| 2010/0299666 A1 | 11/2010 | Agbaria et al. |
| 2010/0306381 A1 | 12/2010 | Lublin et al. |
| 2012/0089864 A1 | 4/2012 | Tanaka et al. |
| 2012/0278571 A1 | 11/2012 | Fleming et al. |
| 2013/0145362 A1 | 6/2013 | Dawson et al. |
| 2013/0198561 A1 | 8/2013 | Fleming et al. |
| 2013/0339647 A1 | 12/2013 | Jindo et al. |

OTHER PUBLICATIONS

"Live Partition Mobility With Oracle e-Business Suite on AIX Proof of Concept," May 2008, abstract only.

Pegler et al., "VMAX and VPLEX Building the virtual data center," 2011 EMC Corporation, pp. 1-46.

Notice of Allowance from U.S. Appl. No. 13/457,245, dated Jul. 25, 2014.

Non-Final Office Action from U.S. Appl. No. 13/457,245, dated Apr. 7, 2014.

Notice of Allowance from U.S. Appl. No. 13/787,650, dated Jul. 25, 2014.

Non-Final Office Action from U.S. Appl. No. 13/787,650, dated Apr. 8, 2014.

Fleming et al., U.S. Appl. No. 13/457,245, filed Apr. 26, 2012.

Fleming et al., U.S. Appl. No. 13/787,650, filed Mar. 6, 2013.

MIGRATING VIRTUAL MACHINES ACROSS SITES

RELATED APPLICATIONS

This application is a continuation of U.S. application Ser. No. 13/787,650, filed Mar. 6, 2013, which is a continuation of U.S. application Ser. No. 13/457,245, filed Apr. 26, 2012, which claims priority to Chinese Application number 201110104772.6, filed Apr. 26, 2011, the entire contents of which are incorporated herein by reference.

BACKGROUND

The invention relates to virtual machine migration, and more particularly to migrating virtual machines across sites.

In order to improve the security and continuity of data storage, more and more companies create their data center at different locations sites to prevent disaster or adjust and balance the load. On the other hand, along with the development of virtualization technique, many data centers use virtual machines to realize the management of data. In many cases such as maintaining sites, adjusting the power, balancing the load between sites and so on, it may be necessary to move the loaded virtual machines across sites, i.e., to migrate virtual machines from one physical system to another different physical system. However, migrating virtual machines without influencing their applications and services is a common concern.

Most companies who provide host virtualization have their special virtual machine migration tools. For example, some current tools have a virtual machine migration function, which can move a running virtual machine to a different physical system without encountering any down-time. However, the current migration tools both require a centralized shared storage, such as SAN (storage area network), NAS (network-attached storage) and so on, between the source and the target physical system. Such a requirement limits the virtual machine migration to be executed within the same site, and thus makes the system unable to execute the migration across sites.

Furthermore, in order to overcome the above limitation, computing facilities have implemented various methods for virtual machine migration across sites. One solution realizes virtual machine migration by firstly suspending and mirroring a virtual machine to an image, then copying it through network, and finally resuming it in another computer. However, this is a stop-and-copy process, which obviously interrupts the running of the virtual machine, and causes its applications or services to halt or timeout. Another solution proposes to set up optical paths dynamically between hosts, via which a virtual machine can be migrated from the source site to the target site. But this solution needs to install a tunable controlling agent on each virtual machine, and requires a Synchronous Optical Network (SONET), Synchronous Digital Hierarchy (SDH), or Dense Wavelength Division Multiplexing (DWDM) connection between hosts to copy data on the memory and disks. It is understood that each application or service is expected to still run during migration, therefore data accessing and changing still happen on disks. When the data changing rate on disks is higher than the network copying rate, a part of data cannot be copied to the target site, which causes data loss. Therefore, this solution does not address the data consistency problem, which is disadvantageous for the security of virtual machine migration.

SUMMARY

Embodiments of the invention provide an efficient across-site virtual machine migration solution.

A system for managing data swapping in migrating virtual memory data of a virtual machine, where the data swapping is from a first storage device at a first site to a second storage device at a second site, is provided according to one embodiment. The system includes a mirror modifying unit configured to modify, in response to a fail report indicating a failure to access the first storage device, a mirror direction between the first and second storage devices. A notifying unit is configured to send a path modifying notification for modifying settings of a first path to the second storage device. A path modifying unit is configured to activate the first path by modifying a path table according to the path modifying notification, so as to make the second storage device accessible.

A method for managing data swapping in a migration of virtual memory data in a virtual machine, where the data swapping is from a first host associated with a first storage device to a second host associated with a second storage device, is provided in another embodiment. The method includes receiving a migration instruction indicating the virtual machine to be migrated, and instructing the first host to copy data of the virtual machine to a sub-logical unit in the first storage device, the sub-logical unit having a mirror logical unit in the second storage device. A notification is sent, the notification being usable to instruct the second host to read data from the mirror logical unit.

A computer program product for managing data swapping in migrating virtual memory data of a virtual machine, where the data swapping is from a first storage device at a first site to a second storage device at a second site, is provided according to yet another embodiment. The computer program product includes a computer readable storage medium having program instructions embodied therewith, the program instructions executable by a processor to cause the processor to: modify, by the processor in response to a fail report indicating a failure to access the first storage device, a mirror direction between the first and second storage devices; send, but the processor, a path modifying notification for modifying settings of a first path to the second storage device; and activate, but the processor, the first path by modifying a path table according to the path modifying notification, so as to make the second storage device accessible.

DETAILED DESCRIPTION

Figure 1:
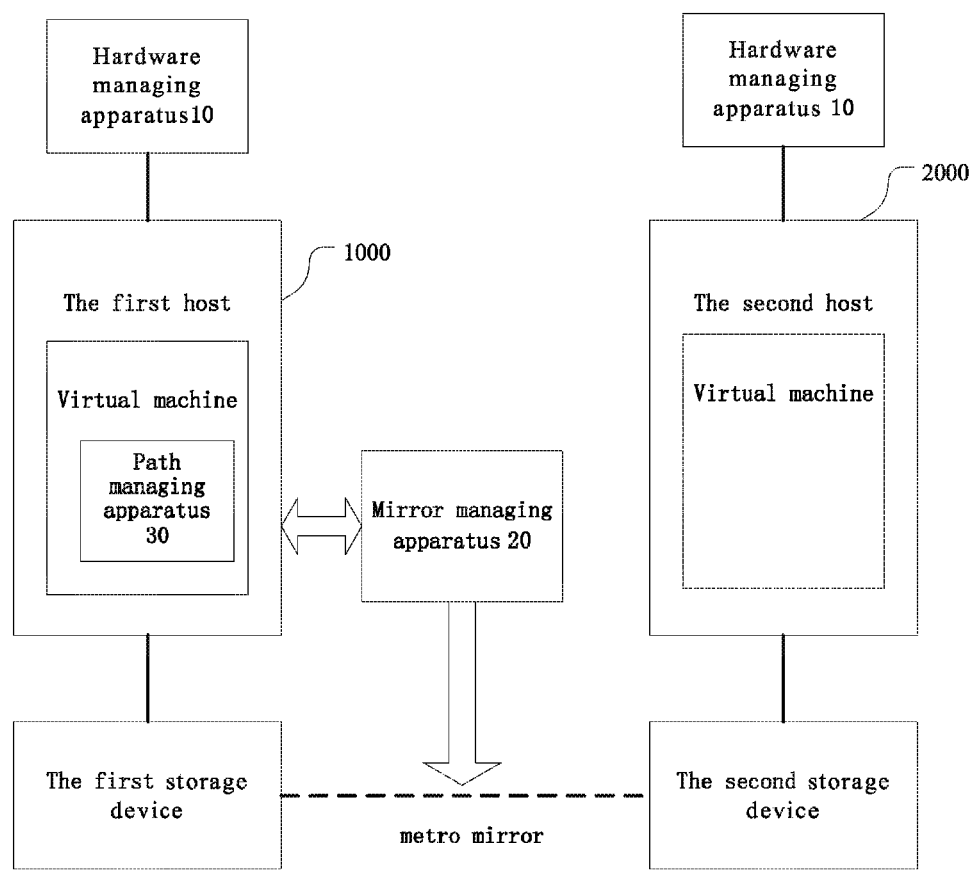
FIG. 1 is a block diagram of a system according to one embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that, the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following is a description of the embodiments in connection with the drawings. It is understood that the following described exemplary embodiments are intended to be illustrative, rather than restrictive, of the present invention.

Certain embodiments of this invention realize across-site live migration of virtual machines using metro mirror and data swap. Generally, the migration of a virtual machine mainly contains an operating system migration and a storage data migration, considering the host level difference and handling different virtual hardware at the same time. The above operating system migration consists of copying or moving the important data related with the running of the virtual machine. Only after data is migrated from the source site to the target site, the virtual machine can boot on the host in the target site. This data may include, for example, the processes of the operating system, system status, the status of the running applications, and so on, which are usually stored in the memory of the host. Therefore, the operating system migration is often called memory migration or host migration.

On the other hand, the storage data migration mainly consists of migrating the data stored in large volume nonvolatile storage devices (e.g. disks) from the source site to the target site. Such migration is usually called storage device migration. For live migration, it is expected that the virtual machine running in the source site can be migrated to the target site and reboot in a very short time. That is, the data in the memory and the storage device are all copied to the target site while influencing the running of the virtual machine as little as possible. To meet such requirement of migration speed, metro mirror approach can be adopted to create a mirror relationship in advance between the storage device of the source site and that of the target site, thereby realizing data copy and backup.

In a metro mirror approach, data from the host are written into the local disk system, and the local disk system synchronously transfers the data to a remote disk system. Only after the two disk systems both have the copy of the data, the local system will return an I/O finish notification to the host. Therefore, in this approach, the local storage device and the remote backup storage device both keep the latest update. Generally, optical network is adopted to transfer data between disk systems that have metro mirror relationship to achieve high speed data copy. In one implementation, the mirror relationship of storage devices is managed using a mirror managing apparatus.

In order to achieve virtual machine migration using metro mirror approach, embodiments of this invention may include a hardware managing apparatus to copy and move the memory data. The embodiments of the invention may also provide a mirror managing apparatus and a path managing apparatus, which communicate and cooperate with one another to assist the swap of the virtual machine storage data. Compared with the solution that transfers the whole virtual machine as an image, this virtual machine migration solution for migrating the memory data and swapping the storage data separately can be called a asynchronous migration.

FIG. 1 is a block diagram of the system according to one embodiment of the invention. As shown in the figure, the virtual machine originally runs in the host of source site 1000, i.e., the first site, and reads/writes data from/into the local storage device (the source storage device or the first storage device) in the source site. Accordingly, in the second site 2000 (the target site), there provides the corresponding host and storage device, called the second host and the second storage device respectively. In order to migrate the virtual machine from the first site to the second site, a metro mirror relationship is created between the first storage device and the second storage device. Separately from the first host and the second host, a mirror managing apparatus 20 is provided to manage the data mirror and swapping so as to assist virtual machine migration.

Hardware managing apparatuses 10 are provided corresponding to the hosts in the sites to manage the copy of the memory data so as to assist virtual machine migration. The first host and the second host each have their hardware managing apparatus 10, which can communicate with each other. Each hardware managing apparatus can directly instruct the corresponding host to execute particular operations. Furthermore, a path managing apparatus 30 is installed in the virtual machine running on the host to manage the access paths of the storage devices so as to assist virtual machine migration. The following is a detailed description of each apparatus.

Corresponding to the host, the hardware managing apparatus 10 is used to manage the hardware system including the memory of the host, so as to assist the realizing of memory copy. In one embodiment, the hardware managing apparatus can be implemented by extending the function based on HMC (Hardware Manage Console) of the existing technique.

In one embodiment, the hardware managing apparatus 10 is configured to realize the copy of memory data using optical network. Although memory data are not as large as disk data, they still bring heavy burden if transferred via the conventional Ethernet and can't ensure the rapid copy in a short time required by live migration. Thus, the hardware managing apparatus 10 can use Ethernet to do the routine signal communication and use optical network to copy memory data.

Figure 2:
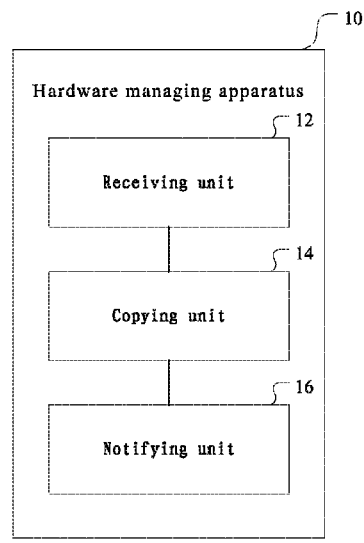
FIG. 2 illustrates a hardware managing apparatus according to one embodiment of the invention.

FIG. 2 illustrates the block diagram of the hardware managing apparatus according to one embodiment of the invention. As shown in the figure, hardware managing apparatus 10 comprises a receiving unit 12, a copy unit 14, and a notifying unit 16.

Specifically, in one embodiment, the receiving unit 12 functions as an interface configured to receive migration instructions and the second site information. Therefore, when a user needs to migrate a virtual machine, the user can send the migration instruction and specify the information of the target site via the receiving unit 12. For example, the user can specify the IP address or other identifying information of the target host, so that the hardware managing apparatus 10 can determine the migration destination. Then, according to the obtained second site information, the hardware managing apparatus 10 communicates signals with the hardware managing apparatus of the second host, and thus with the second host, in the routine way, so as to prepare network for data copy. After that, according to the second host information, the copy unit 14 instructs the first host to copy the memory data via optical network directly to the second site, more particularly, to the second host in the second site. After copy, the notifying unit 16 sends a notification to the second host via the hardware managing apparatus of the second host to inform it to read the memory data, so as to boot the operating system of the virtual machine.

Figure 3:
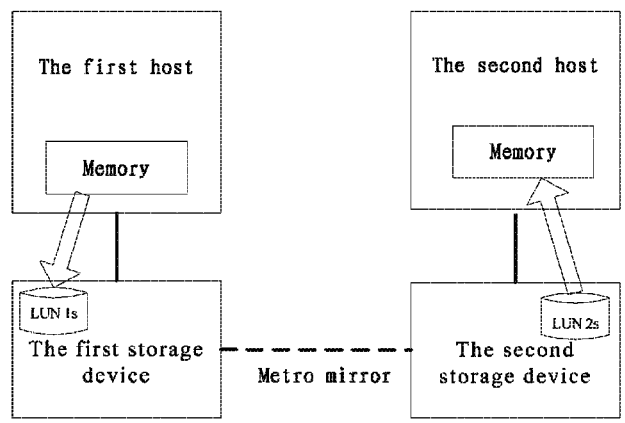
FIG. 3 illustrates the memory copy according to one embodiment of the invention.

In another embodiment, the hardware managing apparatus 10 copies memory data using the created metro mirror relation. FIG. 3 illustrates the memory copy according to one embodiment of the invention. In the figure, a metro mirror relationship has been established between the first storage device in the first site and the second storage device in the second site. As known by those skilled in the art, each storage device comprises a plurality of logical unit, often represented as LUN (logical unit number). The metro mirror relationship between storage devices is composed of the metro mirror relationship of each logical unit LUN. According to the copy solution shown in FIG. 3, a small-size sub-logical unit is set in the first storage device in the first site, labeled as LUN1s, whose size is equal to the memory size of the virtual machine. Then, the copy unit 14 in the hardware managing apparatus 10 is configured to, in response to the migration instruction, instruct the first host to copy the memory data of the virtual machine to said sub-logical unit LUN1s. Since metro mirror relationship has been created between the first storage device and the second storage device, the memory data are written into mirrored unit LUN2s in the second storage device, which is corresponding to LUN1s, via optical network while they are copied to LUN1s. Therefore, logical unit LUN2s now has stored the memory data of the virtual machine that is still running in the first host. After the memory copy is finished, the notifying unit 16 sends a notification to the hardware managing apparatus of the second host according to the above second site information, and then the hardware managing apparatus of the second host accordingly sends an indication to the second host to inform it to read data from mirror unit LUN2s in the second storage device. Thus, the second host can read data from LUN2s in the local connected second storage device as the memory data and boot the virtual machine based on such memory data accordingly.

In the above solution, the copy unit 14 firstly instructs the first host to copy the memory data into the first storage device; because the first host and the first storage device are in local connection, such copy process is very fast. Then, based on the metro mirror relationship between the first storage device and the second storage device, the data are written into the second storage device at the same time. Because the metro mirror relationship is created in advance, this writing process reuses the established metro mirror optical network, which is fast and efficient. Then, the notifying unit 16 sends a data reading notification to the second host via the hardware managing apparatus of the second host. As described above, such notification signal can be transferred via Ethernet. After receiving the notification signal, the second host can read data from the second storage device. Similarly, because the second host and the second storage device are in local connection, such reading process is also very fast. Therefore, in this solution, although the memory data are not directly copied to the second host but copied by means of the mirror relation between storage devices, however, the copy efficiency is very high, since every data transferring process is very quick and the created optical network is also utilized.

In one embodiment, the copy unit 14 instructs the host to copy memory data step by step. For example, the copy unit 14 may firstly instruct the host to copy the core data, that's, the most important data which are necessary when booting the operating system of the virtual machine; then to copy other complementary data, such as the status data. There are many algorithms and solutions to judge and distinguish the core data in the existing techniques. The copy unit 14 can adopt such existing techniques to select the core data from the memory data and copy the core data first of all. Thereby, the data related with the operating system can be migrated in a quite short time, so that the virtual machine can boot in the target host as quickly as possible, hence shortening the down time.

By means of the hardware managing apparatus 10 of the above embodiments, the memory data of a virtual machine are copied from the first host to the second host. Then, the operating system of the virtual machine will reboot in the second host. However, when the virtual machine tries to access the related storage devices, access will fail. That's because only the memory data of the virtual machine are coped into the second host, while the related configuration in the operating system doesn't change. Therefore, the virtual machine rebooted in the second host runs the operating system according to the original configuration. It is understood that according to the original configuration, the first storage device is in local connection and the operating system can access its LUN directly. So, even the operating system has been migrated to the second host, the virtual machine still takes the first storage device as the default local storage device and tries to access it via the original path. However, since the second host and the first storage device are not in the same site, such access won't get success obviously. Thus, the related configuration information needs to be modified to swap the storage device in order to make the virtual machine work successfully.

To swap the storage device from the first site to the second site, in one embodiment of the invention, the mirror managing apparatus 20 and the path managing apparatus 30 in FIG. 1 are configured to interact and cooperate with each other to realize the swap of the storage devices together.

Specifically, in one embodiment, the mirror managing apparatus 20 is implemented by extending the function based on the existing mirror managing apparatuses such as IBM TPC-R (Total Productivity Center for Replication). Alternatively, the mirror managing apparatus 20 can be also implemented independently from the existing mirror managing apparatuses. As the basic function of mirror management, apparatus 20 maintains and keeps the mirror relationship between the first storage device and the second storage device. To assist the swap of storage data, the mirror managing apparatus 20 is further configured as the structure shown in FIG. 4.

Figure 4:
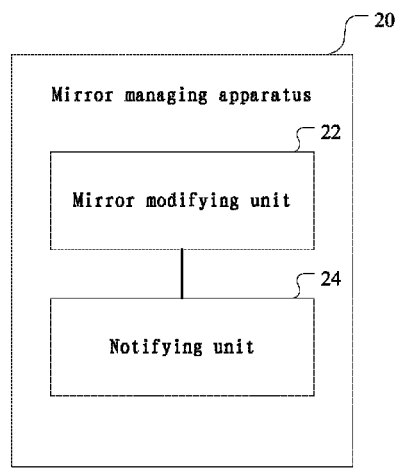
FIG. 4 is a block diagram of a mirror managing apparatus according to one embodiment of the invention.

FIG. 4 is a block diagram of the mirror managing apparatus according to one embodiment of the invention. As shown in the figure, the mirror managing apparatus 20 comprises a mirror modifying unit 22, configured to, in response to the received fail report of the failed access to the first storage device, modify the mirror direction between the first storage device and the second storage device; and a notifying unit 24, configured to send a path modifying notification instructing the modification of the setting of path to the second storage device.

The path managing apparatus 30 communicates with the above mirror managing apparatus 20. In one embodiment, the path managing apparatus 30 can be implemented by extending the function based on the existing path managing apparatuses such as SDD. SDD (Multi-path Subsystem Device Driver) is a tool supporting multi-path configuration environment, providing the driving and connection from the host to the storage device. Using SDD, a host can access one logical unit LUN via multiple data channels at the same time. Alternatively, the path managing apparatus 30 can be also implemented independently from the existing path managing apparatuses. To assist the swap of the storage data, the path managing apparatus 30 is further configured as the structure shown in FIG. 5.

Figure 5:
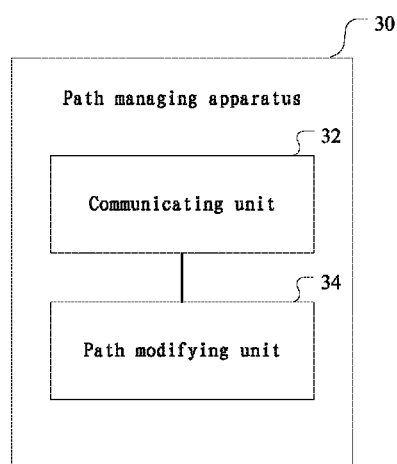
FIG. 5 is a block diagram of a path managing apparatus according to one embodiment of the invention.

FIG. 5 is a block diagram of the path managing apparatus according to one embodiment of the invention. As shown in the figure, the path managing apparatus 30 comprises a communicating unit 32, configured to send a fail report of access when the access to the first storage device according to a path table fails and to receive the path modifying notification; and a path modifying unit 34, configured to activate the fake path to the second storage device by modifying the path table according the obtained path modifying notification to enable the second storage device accessible.

Figure 6:
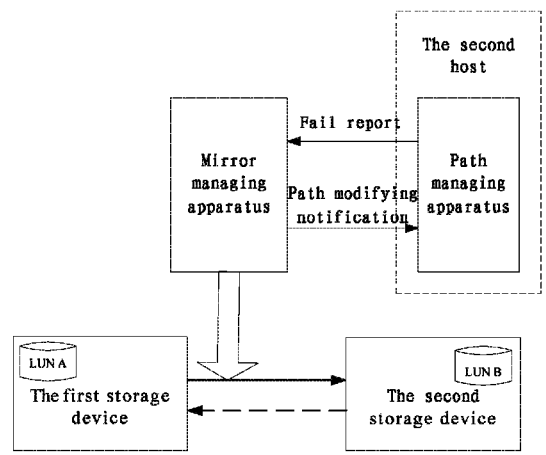
FIG. 6 illustrates the interaction of the mirror managing apparatus and the path managing apparatus in one embodiment.

The following is a detail description on the implementation of the mirror managing apparatus and the path managing apparatus in connection with embodiments. FIG. 6 illustrates the interaction of the mirror managing apparatus and the path managing apparatus in one embodiment. To record and manage mirror relations, the mirror managing apparatus 20 may comprise a mirror storage unit (not shown) to store the current mirror relations. On the other hand, the path managing apparatus 30 may comprise a path table maintaining unit (not shown) to maintain the path table which records the information of multiple paths that point to each LUN in the storage device. In the embodiment shown in FIG. 6, the first storage device contains LUN A, and the second storage device contains LUN B. Supposed that at the beginning, the metro mirror relationship has not been created between the first storage device and the second storage device, and the virtual machine is in the first site. At this time, because the migration of the virtual machine hasn't begun, the path managing apparatuses 30 is located in the first host. Therefore, the path table in the path managing apparatus 30 only records the paths that point to the local LUN A. The path table is shown as follows:

DEV#: 0 DEVICE NAME: hdisk0 TYPE: 2107900 ALGORITHM: Load Balance
SERIAL: 75022812202 * * indicates the volume where I/O routed to

| Path# | Adapter/Path Name | State | Mode | Select | Errors |
|---|---|---|---|---|---|
| 0 | vscsi0/path0 | OPEN | NORMAL | 108583 | 0 |
| 1 | vscsi0/path1 | OPEN | NORMAL | 108267 | 0 |

Once the metro mirror relation is created between LUN A and LUN B, the mirror storage unit in the mirror managing apparatus 20 will record such information. Specifically, the mirror managing apparatus 20 will record the information of LUN B and the mirror direction, for example, the information that LUN A is the primary logical unit and LUN B is the backup logical unit, as shown by solid arrow. Moreover, the mirror managing apparatus 20 will communicate with the path managing apparatus 30 and notify it of the creating of mirror relation. In response to said notification, the path table maintaining unit in the path managing apparatus 30 creates a "fake path" in its path table, that's the paths to LUN B. The path table now is shown as follows:

DEV#: 0 DEVICE NAME: hdisk0 TYPE: 2107900 ALGORITHM: Load Balance
SESSION: newsession
PRIMARY SERIAL: 75022812202 *       * indicates the volume where I/O routed to

| Path# | Adapter/Path Name | State | Mode | Select | Errors |
|---|---|---|---|---|---|
| 0 | vscsi0/path0 | OPEN | NORMAL | 108583 | 0 |
| 1 | vscsi0/path1 | OPEN | NORMAL | 108267 | 0 |

SECONDARY SERIAL: 75022811752

| Path# | Adapter/Path Name | State | Mode | Select | Errors |
|---|---|---|---|---|---|
| 2 | vscsi0/path2 | CLOSE | INACTIVE | 0 | 0 |
| 3 | vscsi0/path3 | CLOSE | INACTIVE | 0 | 0 |

In the above path table, path 0/1 are the paths to LUN A (the serial is 75022812202), and path 2/3 are the paths to LUN B (the serial is 75022811752). Considering the metro mirror relationship between LUN B and LUN A, in one embodiment, the path managing apparatus 30 can group them together, identified as disk hdisk0. Because the path managing apparatus 30 is currently in the first host and in local connection with the first storage device, LUN A is accessible (the status is normal) and LUN B is not accessible (the status is inactive). Thus, the paths to LUN B can be called fake paths.

Along with the migration of the memory data of the virtual machine (using the above-described hardware managing apparatus), the operating system is migrated to the second host. Because the path managing apparatus 30 is installed in the virtual machine, it is also migrated to the second host along with the migration of the operating system. As described above, when the second host accesses the related storage device via the path managing apparatus 30, it identifies LUN A as the primary logical unit according to the above path table. However, because LUN A and the second host are not in local connection, such access will fail. Then, the path managing apparatus 30 will get a fail report and send it to the mirror managing apparatus 20 via the communicating unit 32.

After the mirror managing apparatus 20 receives the fail report that the access to LUN A fails, it reads the maintained mirror relationship related to LUN A from the mirror storage unit and modifies it via the mirror modifying unit 22. More specifically, in the maintained original mirror relation, LUN A is the primary logical unit, LUN B is the backup logical unit, and the data writing direction is from LUN A to LUN B. Responding to the fail report that the access to LUN A fails, the mirror modifying unit 2 modifies the direction of the mirror relation, setting LUN B as the primary logical unit and LUN A as the backup logical unit, which enables the data be written from LUN B to LUN A shown as dashed arrow. What's more, the mirror managing apparatus 20 sends a path modifying notification to the path managing unit 30 via the notifying unit 24 and requests it to modify the setting of path to LUN B.

Thereupon, the communicating unit 32 in the path managing unit 30 receives said path modifying notification, which contains the information related to LUN B. According to this path modifying notification, the path modifying unit 34 modifies the original path table, activates the fake paths to LUN B to enable them accessible. Specifically, the path modifying unit 34 modifies the path table as follows:

DEV#: 0 DEVICE NAME: hdisk0 TYPE: 2107900 ALGORITHM: Load Balance
SESSION: newsession
PRIMARY SERIAL: 75022812202

| Path# | Adapter/Path Name | State | Mode | Select | Errors |
|---|---|---|---|---|---|
| 0 | vscsi0/path0 | CLOSE | INACTIVE | 109345 | 234 |
| 1 | vscsi0/path1 | CLOSE | INACTIVE | 109210 | 439 |

SECONDARY SERIAL: 75022811752 *
            * indicates the volume where I/O routed to

| Path# | Adapter/Path Name | State | Mode | Select | Errors |
|---|---|---|---|---|---|
| 2 | vscsi0/path2 | OPEN | NORMAL | 1305 | 0 |
| 3 | vscsi0/path3 | OPEN | NORMAL | 1203 | 0 |

In the above new path table, path 0/1 to LUN A (the serial is 75022812202) are set inactive, and path 2/3 to LUN B (the serial is 75022811752) are set normal. Thereby, the path modifying unit 34 activates the "fake paths" to LUN B. Via said "fake paths", the second host can access LUN B.

Although the above embodiments are described using particular logical units in storage devices (LUN A and LUN B) as examples, it is understood that, because a storage device is composed of multiple LUNs, for the whole storage device, above method can be adopted to change the mirror copy direction, create and activate the paths to the target storage device, so as to swap the storage data from the source storage device to the target storage device.

Figure 7:
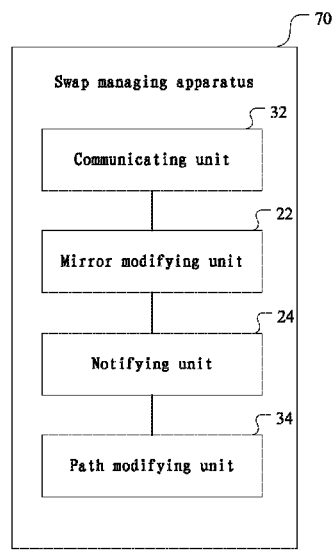
FIG. 7 is a block diagram of a swap managing apparatus according to one embodiment of the invention.

In one embodiment, the mirror managing apparatus 20 and the path managing apparatus 30 can be regarded as a swap managing apparatus. FIG. 7 is a block diagram of the swap managing apparatus according to one embodiment of the invention. The swap managing apparatus 70 comprises the above-described communicating unit 32, mirror modifying unit 22, notifying unit 24 and path modifying unit 34.

In summary, on the basis that the metro mirror has been established between the first storage device in the first site and the second storage device in the second site, the virtual machine memory is migrated from the first host to the second host using the hardware managing apparatus 10, the virtual machine storage data are swapped from the first storage device to the second storage device using the swap managing apparatus 70, and thereby the memory data and the storage data are migrated separately in asynchronous way. Therefore, the virtual machine is live migrated from the first site to the second site.

In one embodiment, the swap managing apparatus 70 swaps the storage data based on the memory migration executed by the hardware managing apparatus 10, while the hardware managing apparatus 10 migrates the memory data so that swap managing apparatus 70 can swap the storage data later.

Corresponding to the above apparatus, the embodiments of this invention also provide the method for migrating virtual machines.

Figure 8:
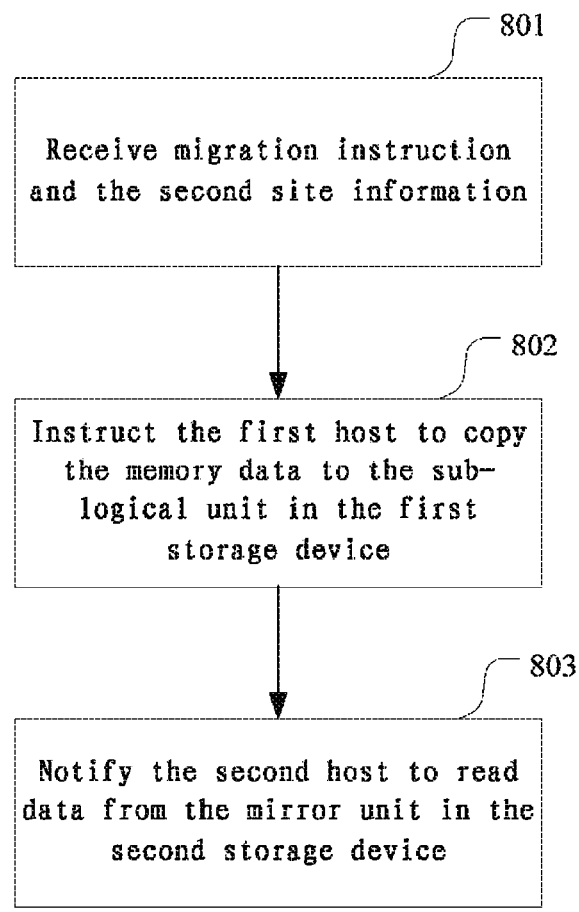
FIG. 8 is a flowchart of a method for migrating memory data according to one embodiment of the invention.

FIG. 8 is a flowchart of the method for migrating memory data according to one embodiment of the invention. Specifically, the method shown in FIG. 8 can be executed by the above-described hardware managing apparatus, so as to assist the migration of virtual machine memory data from the first site to the second site, wherein the first site comprises the first host and the first storage device, the second site comprises the second host and the second storage device, and a metro mirror relationship has been established between the first storage device and the second storage device. As shown in the figure, said method comprises: step 801, receiving the migration instruction and the second site information; step 802, instructing the first host to copy the virtual machine memory data to a sub-logical unit in the first storage device, said sub-logical unit having a mirror logical unit in the second storage device; and step 803, according to said second site information, sending a notification to instruct the second host to read memory data from said mirror logical unit.

Figure 9:
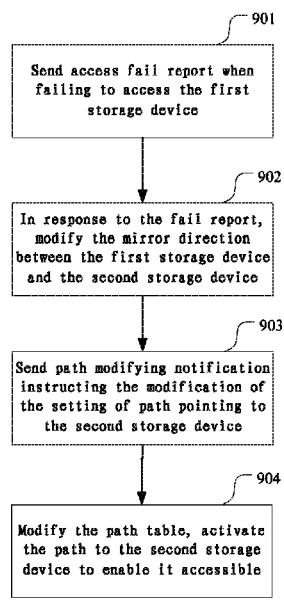
FIG. 9 is a flowchart of a method for swapping storage data according to one embodiment of the invention.

FIG. 9 is a flowchart of the method for swapping storage data according to one embodiment of the invention. Specifically, the method in FIG. 9 can be executed by the above-described swap managing apparatus, so as to swap the virtual machine storage data from the first storage device to the second storage device, wherein a metro mirror relationship has been established between the first storage device and the second storage device. As shown in the figure, said method comprises: step 901, sending a fail report of access when the access to the first storage device according to a path table fails; step 902, in response to said fail report, modifying the mirror direction between the first storage device and the second storage device; step 903, sending a path modifying notification instructing the modification of the setting of path to the second storage device; and step 904, activating the paths to the second storage device by modifying the path table according to said path modifying notification so as to enable the second storage device accessible.

The executing principle and manner of the methods shown in FIG. 8-9 correspond to the above-described hardware managing apparatus and swap managing apparatus. Using the above methods, memory data and the storage data of the virtual machine can be migrated respectively, and therefore, across-site live migration of the virtual machine can be realized.

Figure 10:
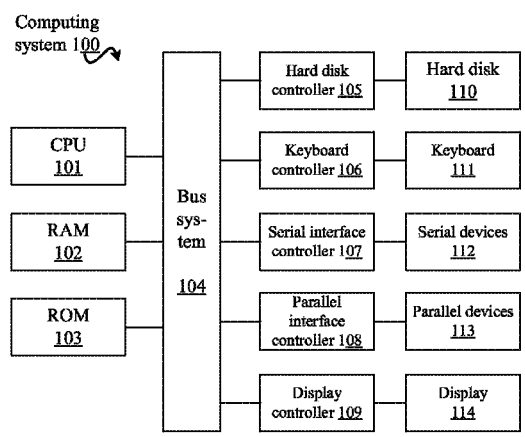
FIG. 10 is a block diagram of a computing system for realizing the embodiments of the invention.

FIG. 10 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 10 is only for the exemplary purpose rather than any limitation to the present invention. In some cases, some devices may be added to or removed from the computer system 100 based on specific situations.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described exemplary embodiments are intended to be illustrative in all respects of the method and apparatus, rather than restrictive, of the present invention. Those skilled in the art should recognize that the present invention is capable of many variations and modifications within the scope and spirit of the present invention.

The invention claimed is:

1. A system for managing data swapping in migrating virtual memory data of a virtual machine, wherein the data swapping is from a first storage device at a first site to a second storage device at a second site, the device comprising:

a mirror modifying unit configured to modify, in response to a fail report indicating a failure to access the first storage device, a mirror direction between the first and second storage devices;

a notifying unit configured to send a path modifying notification for modifying settings of a first path to the second storage device; and a path modifying unit configured to activate the first path by modifying a path table according to the path modifying notification, so as to make the second storage device accessible.

2. The system of claim 1, wherein the first and second storage devices have a metro mirror relationship; and comprising a mirror storage unit configured to store the metro mirror relationship, in response to the metro mirror relationship being established, wherein the first storage device is a primary storage device, the second storage device is a backup storage device, and data is written from the first storage device to the second storage device.

3. The system of claim 2, wherein the mirror modifying unit is configured to modify a mirror direction of the metro mirror relationship, so that the second storage device becomes the primary storage device, the first storage device becomes the backup storage device, and the data is written from the second storage device to the first storage device.

4. The system of claim 2, comprising a path table maintaining unit, configured to communicate with said mirror storage unit so as to create the first path to the second storage device in the path table in response to establishing the metro mirror relationship, wherein a second path to the first storage device is set active and the first path to the second storage device is set inactive in the path table.

5. The system of claim 4, wherein the path modifying unit is configured to modify the path table according to the path modifying notification by setting the second path to the first storage device inactive and setting the first path to the second storage device active.

6. The system of claim 1, wherein data is also swapped from a first host at a first site to a second host at a second site, the system comprising:

a receiving unit configured to receive a migration instruction indicating the virtual machine to be migrated and information about the second site; and a copying unit configured to instruct the first host to copy data of the virtual machine to a sub-logical unit in the first storage device, the sub-logical unit having a mirror logical unit in the second storage device;

wherein the notifying unit is configured to send a notification according to the information about the second site, wherein the notification is used to instruct the second host to read data from the mirror logical unit.

7. The system of claim 6, wherein the first and second storage devices have a metro mirror relationship, wherein the notifying unit sends the notification via Ethernet, and the metro mirror relationship is established using an optical network.

8. The system of claim 6, wherein a size of the sub-logical unit is approximately equal to a size of a memory of the virtual machine.

9. The system of claim 6, wherein the copying unit is further configured to instruct the first host to first copy core data of the memory data, followed by complementary data of the memory data.

10. The system of claim 1, wherein the path table comprises a plurality of paths, each path pointing to a logical unit number (LUN) of the first storage device, and wherein the path table comprises at least one path for each LUN of the first storage device.

11. The system of claim 1, wherein the failure to access the first storage device according to the path table is triggered by the virtual machine being migrated from the first storage device to the second storage device.

12. A method for managing data swapping in a migration of virtual memory data in a virtual machine, wherein the data swapping is from a first host associated with a first storage device to a second host associated with a second storage device, the method comprising:

receiving a migration instruction indicating the virtual machine to be migrated;

instructing the first host to copy data of the virtual machine to a sub-logical unit in the first storage device, the sub-logical unit having a mirror logical unit in the second storage device; and sending a notification usable to instruct the second host to read data from the mirror logical unit.

13. The method of claim 12, wherein the first and second storage devices have a metro mirror relationship, wherein the notification is sent via Ethernet, and the metro mirror relationship is established using an optical network.

14. The method of claim 12, wherein a size of the sub-logical unit is approximately equal to a size of a memory of the virtual machine.

15. The method of claim 12, wherein instructing the first host to copy the memory data of the virtual machine to the sub-logical unit in the first storage device comprises instructing the first host to first copy core data of the virtual memory data, followed by complementary data of the virtual memory data.

16. The method of claim 12, comprising:

sending a fail report in response to a failure to access the first storage device according to a path table;

in response to the fail report, modifying a mirror direction between the first and second storage devices;

sending a path modifying notification for modifying settings of a first path to the second storage device; and activating the path to the second storage device by modifying the path table according to the path modifying notification, so as to make the second storage device accessible.

17. The method of claim 16, wherein the first and second storage devices have a metro mirror relationship; and comprising storing the metro mirror relationship between the first and second storage devices in response to the metro mirror relationship being established, wherein the first storage device is a primary storage device, the second storage device is a backup storage device, and data is written from the first storage device to the second storage device.

18. The method of claim 17, wherein modifying the mirror direction between the first and second storage devices comprises modifying a mirror direction of the metro mirror relationship, so that the second storage device becomes the primary storage device, the first storage device becomes the backup storage device, and the data is written from the second storage device to the first storage device.

19. The method of claim 17, further comprising creating a first path to the second storage device in the path table in response to the metro mirror relationship being established, wherein a second path to the first storage device is set active and the first path to the second storage device is set inactive in the path table.

20. A computer program product for managing data swapping in migrating virtual memory data of a virtual machine, wherein the data swapping is from a first storage device at a first site to a second storage device at a second site, the computer program product comprising a non-transitory computer readable storage medium having program instructions embodied therewith, the program instructions executable by a processor to cause the processor to:
- modify, by the processor in response to a fail report indicating a failure to access the first storage device, a mirror direction between the first and second storage devices;
- send, but the processor, a path modifying notification for modifying settings of a first path to the second storage device; and
- activate, but the processor, the first path by modifying a path table according to the path modifying notification, so as to make the second storage device accessible.

* * * * *